United States Patent [19]
Chelko et al.

[11] Patent Number: 5,429,373
[45] Date of Patent: Jul. 4, 1995

[54] PLAY MONEY TO BE EARNED AND SPENT BY CHILDREN

[76] Inventors: Mona J. Chelko; Bernard J. Chelko, both of 121 Cooper Rd., Cabot, Pa. 16023

[21] Appl. No.: 260,463

[22] Filed: Jun. 14, 1994

[51] Int. Cl.6 .......................... A63F 9/00; G09B 19/18
[52] U.S. Cl. ..................... 273/440; 273/459; 434/236; 434/238; 434/107; 434/108; 434/109; 150/143
[58] Field of Search .............. 273/297, 256, 243, 440, 273/459; 434/238, 236, 107, 108, 109, 110; 150/143

[56] References Cited

U.S. PATENT DOCUMENTS

3,199,562  8/1965  Seitz ........................... 150/143
4,909,740  3/1990  Rankin ......................... 434/109

OTHER PUBLICATIONS

"The Allowance Game", Toys To Grow On catalog, Spring 1993, p. 36.
"Homework Helper Kit", Toys To Grow On catalog, Spring 1993, p. 36.

*Primary Examiner*—Benjamin H. Layno

[57] ABSTRACT

Play money to be earned and spent by children comprising a plurality of sheets of bills of money of various numerical denominations, the money having printed thereon the denominations, a happy child face and "money" printed thereon, such money adapted to be earned by children as a reward for activities and for spending or playing video games; and a pouch having a front face and a rear face, each face fabricated in a rectangular configuration and coupled together along side edges and bottom edges leaving an open top edge for the passage of money, the pouch having a flap to close the top edge with a releasable fastener associated with respect thereto, the pouch having printed thereon "money" and a space for receipt of a child's name.

1 Claim, 3 Drawing Sheets

PLAY MONEY TO BE EARNED AND SPENT BY CHILDREN

BACKGROUND OF THE INVENTION

1. Field of the Invention

The present invention relates to play money to be earned and spent by children and more particularly pertains to having children earn play money and spend such money subsequently as a reward.

2. Description of the Prior Art

The use of various types of play money is known in the prior art. More specifically, various types of play money heretofore devised and utilized for the purpose of teaching children the value of earning money and spending such earned money are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,516,496 a copperplate engraving machine for printing paper currency.

U.S. Pat. No. 4,521,197 discloses a money calculation game.

U.S. Pat. No. 4,775,321 discloses a system for teaching money values.

U.S. Pat. No. 5,005,839 discloses a board game.

U.S. Pat. No. 5,062,359 discloses a intaglio printing machine for the printing of currency papers.

U.S. Patent Des. 256,928 discloses the design of a decal or the like.

In this respect, the play money to be earned and spent by children according to the present invention substantially departs from the conventional concepts and designs of the prior art, and in doing so provides an apparatus primarily developed for the purpose of having children earn play money and spend money subsequently as a reward.

Therefore, it can be appreciated that there exists a continuing need for new and improved play money to be earned and spent by children which can be used for having children earn play money and spend money subsequently as a reward. In this regard, the present invention substantially fulfills this need.

SUMMARY OF THE INVENTION

In view of the foregoing disadvantages inherent in the known types of various types of play money now present in the prior art, the present invention provides improved play money to be earned and spent by children. As such, the general purpose of the present invention, which will be described subsequently in greater detail, is to provide a new and improved play money to be earned and spent by children and method which has all the advantages of the prior art and none of the disadvantages.

To attain this, the present invention essentially comprises play money to be earned and spent by children comprising, in combination, a plurality of sheets of bills of video money of various numerical denominations, the video money having printed thereon the denominations, a happy child face and "video money" printed thereon, such video money adapted to be earned by children as a reward for activities and for spending or playing video games; a pouch having a front face and a rear face, each face fabricated in a rectangular configuration and coupled together along side edges and bottom edges leaving an open top edge for the passage of video money, the pouch having a flap to close the top edge with a releasable fastener associated with respect thereto, the pouch having printed thereon "video money" and a space for receipt of a child's name; a plurality of sheets of bills of TV money of various numerical denominations, the TV money having printed thereon the denominations, a happy child face and "TV money" printed thereon, such TV money adapted to be earned by children as a reward for activities and for spending or watching TV; a pouch having a front face and a rear face, each face fabricated in a rectangular configuration and coupled together along side edges and bottom edges leaving an open top edge for the passage of TV money, the pouch having a flap to close the top edge with a releasable fastener associated with respect thereto, the pouch having printed thereon "TV money" and a space for receipt of a child's name; a pad of printed sheet material with rows and columns and indicia across the top to record the jobs, approval and record pay amount, the pad having a supplemental space at the bottom of the last column to indicate the total amount paid, the pad also having supplemental blocks for the name of the child and the date of the activities; and a plurality of bonus tokens in the form of disk-shaped coins for parents to reward children for extra effort and the like.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved play money to be earned and spent by children which has all the advantages of the prior art various types of play money and none of the disadvantages.

It is another object of the present invention to provide new and improved play money to be earned and spent by children which may be easily and efficiently manufactured and marketed.

It is a further object of the present invention to provide new and improved play money to be earned and spent by children which is of durable and reliable constructions.

An even further object of the present invention is to provide new and improved play money to be earned and spent by children which is susceptible of a low cost of manufacture with regard to both materials and labor, and which accordingly is then susceptible of low prices of sale to the consuming public, thereby making such play money to be earned and spent by children economically available to the buying public.

Still yet another object of the present invention is to provide new and improved play money to be earned and spent by children which provide in the apparatuses and methods of the prior art some of the advantages thereof, while simultaneously overcoming some of the disadvantages normally associated therewith.

Still another object of the present invention is to have children earn play money and spend money subsequently as a reward.

Lastly, it is an object of the present invention to provide new and improved play money to be earned and spent by children comprising a plurality of sheets of bills of money of various numerical denominations, the money having printed thereon the denominations, a happy child face and "money" printed thereon, such money adapted to be earned by children as a reward for activities and for spending or playing video games; and a pouch having a front face and a rear face, each face fabricated in a rectangular configuration and coupled together along side edges and bottom edges leaving an open top edge for the passage of money, the pouch having a flap to close the top edge with a releasable fastener associated with respect thereto, the pouch having printed thereon "money" and a space for receipt of a child's name.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
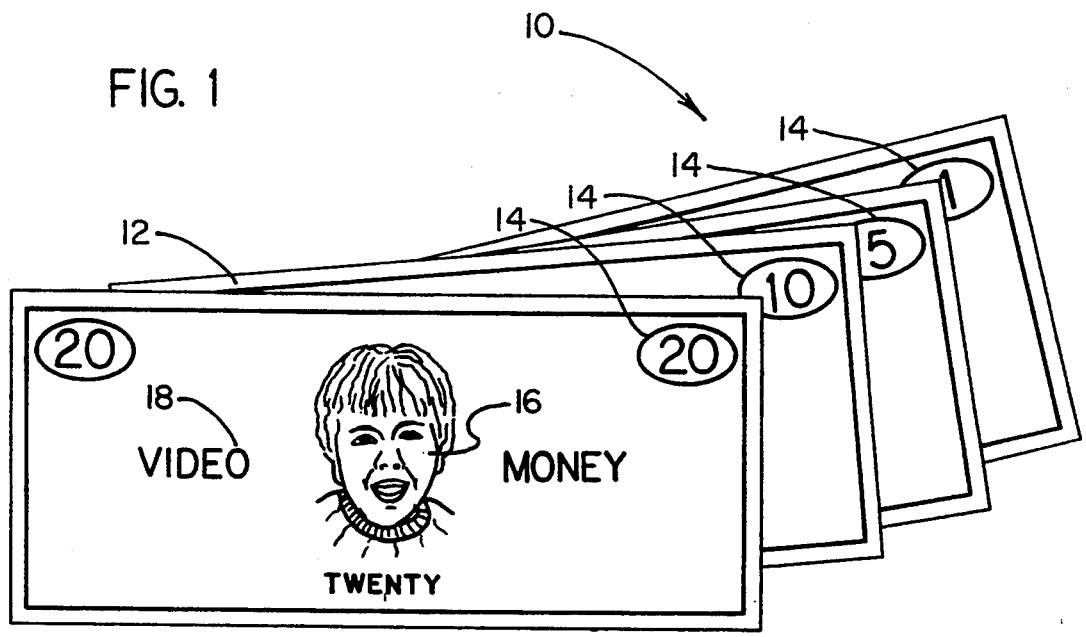
FIG. 1 is a front elevational view of the preferred embodiment of the new and improved play money to be earned and spent by children constructed in accordance with the principles of the present invention.
Figure 2:
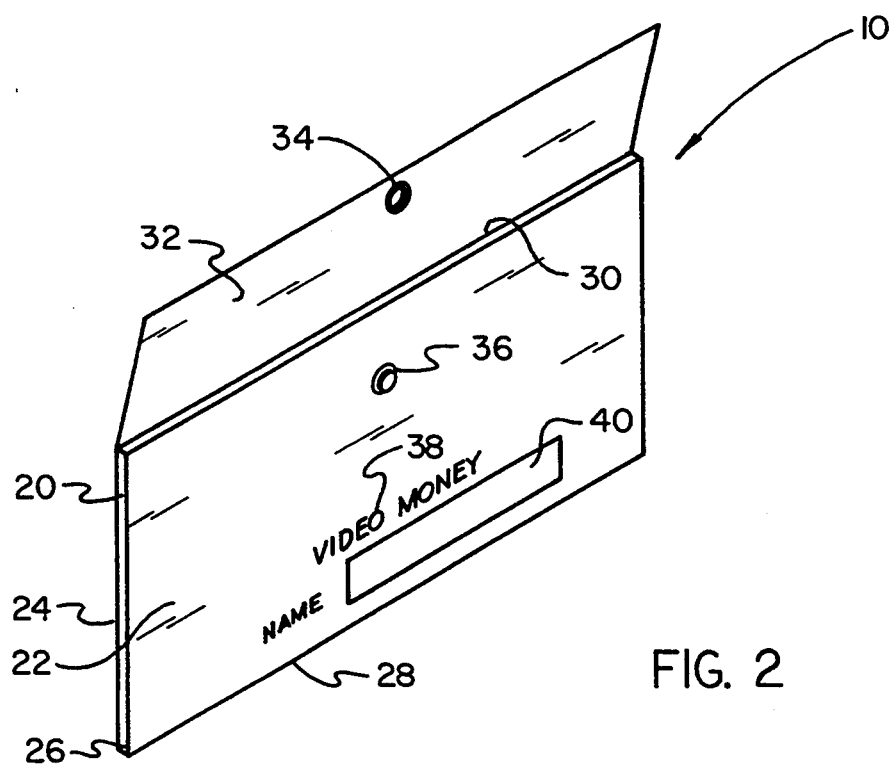
FIG. 2 is a perspective view of a child's pouch to hold his or her video money.
Figure 3:
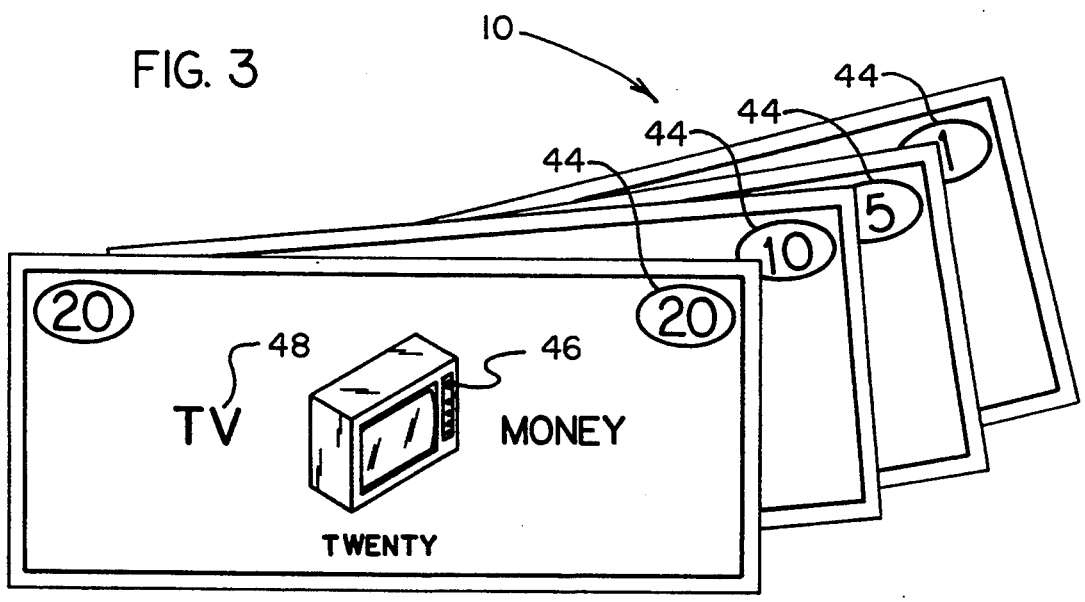
FIG. 3 is a front elevational view of various denominations of television money to be earned by children and used in watching television shows.
Figure 4:
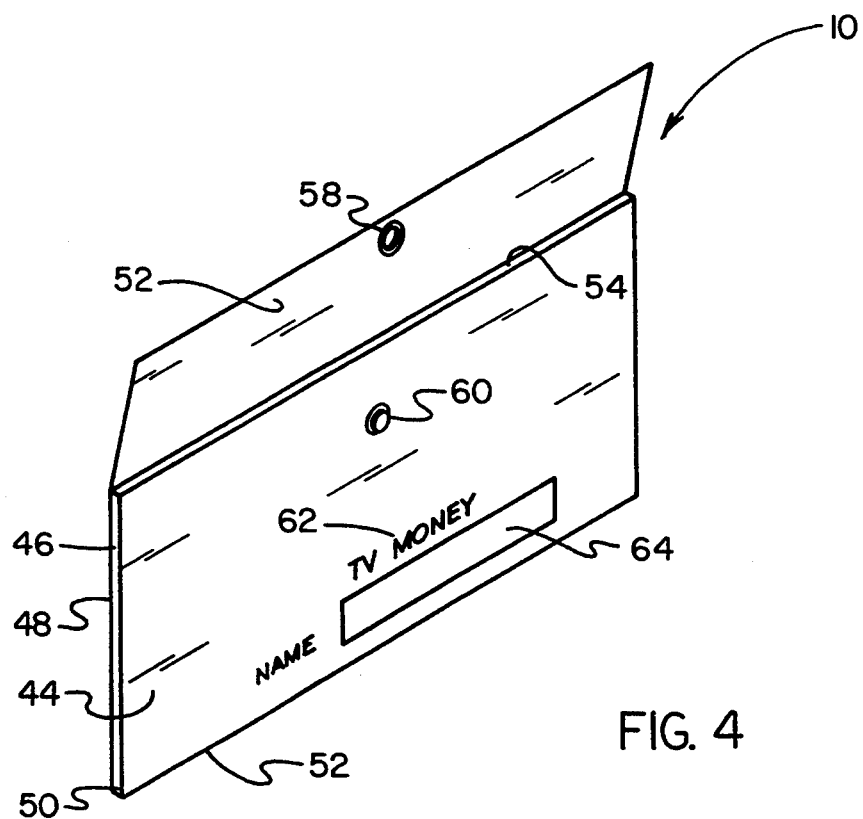
FIG. 4 is a perspective view of a child's pouch to hold his or her television money.
Figure 5:
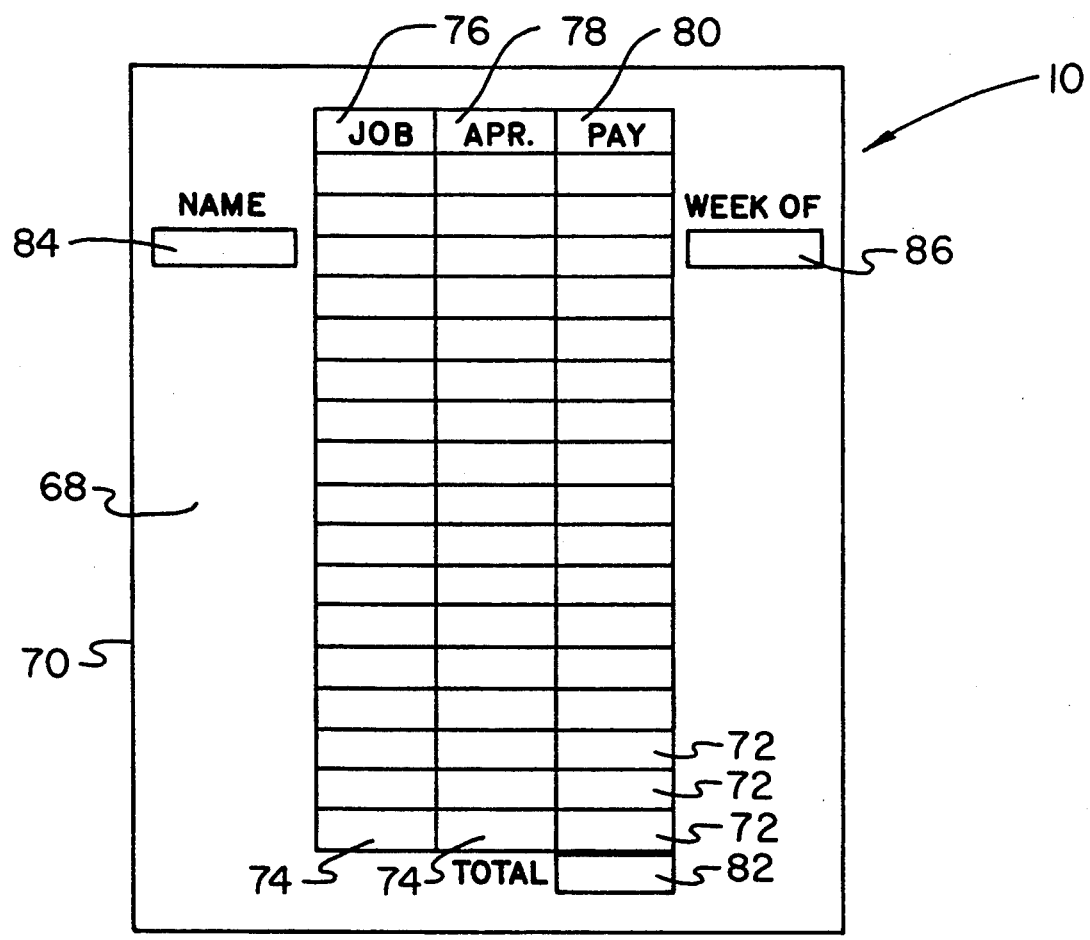
FIG. 5 is pad of printed sheets to assign, approve and total money earned for television games, time or television time.
Figure 6:
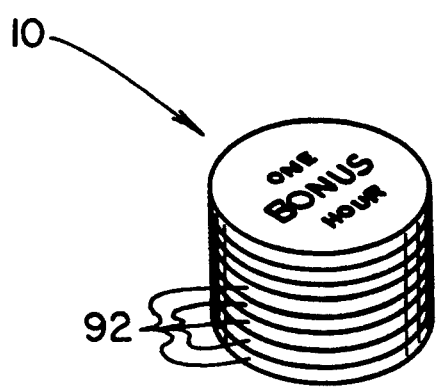
FIG. 6 is a stack of bonus tokens for parents to reward children for extra efforts.

With reference now to the drawings, and in particular to FIG. 1 thereof, the preferred embodiment of the new and improved play money to be earned and spent by children embodying the principles and concepts of the present invention and generally designated by the reference numeral 10 will be described.

The present invention, the new and improved play money to be earned and spent by children, is comprised of a plurality of components. Such components in their broadest context include a plurality of sheets of video money, a pouch for the video money, a plurality of sheets of television money, a pouch for the receipt of the television money, a pad of printed sheet material, a pad of printed sheet material and a plurality of bonus tokens. Such components are individually configured and correlated with respect to each other so as to attain the desired objective.

More specifically, the invention is a system 10 which has as its basic component a plurality of sheets of bills 12. Such bills are of video money. They are provided with markings to indicate the various monetary denominations 14. The video money, in addition to the denominations includes at the center thereof, a happy child's face 16 and the phrase "video money" 18 printed thereon. Such video money is adapted to be earned by children as a reward for activities. Thereafter, the money may be spent as for playing the video games.

Next provided is a pouch 20. The pouch has a front face 22. It also has a rear face 24. The faces are fabricated each in a rectangular configuration of the same size and shape. The faces are coupled together around their side edges 26 and bottom edges 28. Such coupling is preferably through heat sealing but it may be through adhesives or stitching or the like. This will leave an open top edge 30. Such open edge is for the passage of video money into or out of the pouch. The pouch has a flap 32 as an integral extension of the rear face. It is adapted to be folded over and closed over the top edge of the pouch. A releasable fastener 34 and 36 are associated with respect thereto. The pouch has on its front exterior face printing. Such printing includes "video money" 38 and a space 40 for the receipt of a child's name.

Next provided is a second plurality of a sheet of bills. Such bills are of television money. They are provided with markings to indicate the various monetary denominations 44. The television money, in addition to the denominations includes at the center thereof, a happy child's face 46 and the phrase "television money" 48 printed thereon. Such television money is adapted to be earned by children as a reward for activities. Thereafter, the money may be spent as for watching television programs.

Also provided is a second pouch 46. Such second pouch has a front face 44 and a rear face 48. The faces are fabricated each in a rectangular configuration of the same size and shape. The faces are coupled together around their side edges 50 and bottom edges 52. Such coupling is preferably through heat sealing but it may be through adhesives or stitching or the like. This will leave an open top edge 54. Such open edge is for the passage of television money into or out of the pouch. The pouch has a flap 56 as an integral extension of the rear face. It is adapted to be folded over and closed over the top edge of the pouch. A releasable fastener 58 and 60 are associated with respect thereto. The pouch has on its front exterior face printing. Such printing includes "television money" 62 and a space 64 for the receipt of a child's name.

Next provided for use in association with the sheets of bills and pouches is a pad 68 of printed sheets 70. Such sheets of paper or other sheet material are printed with rows 72 and columns 74. In addition, indicia is printed across the top. Such indicia across the top is to record the jobs 76, indicate approval 78, and record pay amount 80. The pad has a supplemental space 82 adjacent to the bottom of the last column. This is to indicate the total amount paid. The pad is also provided with supplemental blocks 84 for the name of the child 86 and the date 88 of the activities.

The last component of the system 10 is a plurality of bonus tokens 92. Such bonus tokens are in the form of disk-shaped coins. Such coins are used by the parents to reward children for extra effort and the like. They may be used as the bills or a plurality of coins of a predetermined number may be exchanged for such bills.

Play money is earned by a child to be spent on the limited or controlled use of video games, or for that matter to be spent for non-educational or non-approved television shows.

Certainly no one wants to limit a developing child's playtime or activities that contribute to the development of social or interactive skills. But, when our 90's children forego ball playing and replace that free time with countless hours at their video games, it should be controlled or limited or earned.

Each parent could use "video money" in their own way. They have to make the decisions of what activities are subject to payment.

Another possibility consists of different colors for each child, for example, Suzy has pink money, David has blue and Wayne has yellow.

Video money is play money earned by a child to be used as a limiter in the use of various home video games. Child may receive an amount, similar to an allowance, for completing daily chores. The child must have a minimum amount of money to turn the game on.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. New and improved play money to be earned and spent by children comprising, in combination:

a plurality of sheets of bills of video money of various numerical denominations, the video money having printed thereon the denominations, a happy child face and "video money" printed thereon, such video money adapted to be earned by children as a reward for activities and for spending or playing video games;

a first one-pocket pouch having a front face and a rear face, each face fabricated in a rectangular configuration and coupled together along side edges and bottom edges leaving an open top edge for the passage of video money, the first pouch having a flap to close the top edge with a releasable fastener associated with respect thereto, the first pouch having printed thereon "video money" and a rectangular space for receipt of a child's name;

a plurality of sheets of bills of TV money of various numerical denominations, the TV money having printed thereon the denominations, the happy child face and "TV money" printed thereon, such TV money adapted to be earned by children as a reward for activities and for spending or watching TV;

a second one-pocket pouch having a front face and a rear face, each face fabricated in a rectangular configuration and coupled together along side edges and bottom edges leaving an open top edge for the passage of TV money, the second pouch having a flap to close the top edge with a releasable fastener associated with respect thereto, the second pouch having printed thereon "TV money" and a rectangular space for receipt of a child's name;

a pad of printed sheet material with rows and columns and indicia across the top to record the jobs, approval and record pay amount, the pad having a supplemental space at the bottom of the last column to indicate the total amount paid, the pad also having supplemental blocks for receiving the name of the child and the date of the activities; and a plurality of bonus tokens in the form of disk-shaped coins for parents to reward children for extra effort and the like.

* * * * *